US012109811B2

(12) United States Patent
Yoshida

(10) Patent No.: US 12,109,811 B2
(45) Date of Patent: Oct. 8, 2024

(54) LIQUID DISCHARGE APPARATUS, DRIVE WAVEFORM GENERATOR, AND HEAD DRIVE METHOD

(71) Applicant: Takahiro Yoshida, Kanagawa (JP)

(72) Inventor: Takahiro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 149 days.

(21) Appl. No.: 17/516,723

(22) Filed: Nov. 2, 2021

(65) Prior Publication Data

US 2022/0169020 A1 Jun. 2, 2022

(30) Foreign Application Priority Data

Nov. 27, 2020 (JP) ................................ 2020-197468

(51) Int. Cl.
*B41J 2/045* (2006.01)
*B41J 2/14* (2006.01)

(52) U.S. Cl.
CPC ....... *B41J 2/04596* (2013.01); *B41J 2/04581* (2013.01); *B41J 2/04588* (2013.01); *B41J 2/04591* (2013.01); *B41J 2202/06* (2013.01)

(58) Field of Classification Search
CPC .................................................... B41J 2/04588
See application file for complete search history.

(56) References Cited

U.S. PATENT DOCUMENTS

2007/0080978 A1 4/2007 Yoshida
2007/0211092 A1 9/2007 Shingyohuchi et al.
2008/0150983 A1* 6/2008 Sasaki .................. B41J 2/04593 347/11
2009/0147034 A1 6/2009 Yoshida
2009/0289975 A1 11/2009 Yoshida
2011/0242171 A1* 10/2011 Zhang .................. B41J 2/04581 347/10
2012/0306954 A1* 12/2012 Nishikawa ........... B41J 2/04581 347/11
2013/0038651 A1* 2/2013 Satou ................... B41J 2/04593 347/9
2014/0218428 A1 8/2014 Araki et al.
(Continued)

FOREIGN PATENT DOCUMENTS

JP 2007-182061 7/2007
JP 2012-187920 10/2012
(Continued)

*Primary Examiner* — Shelby L Fidler
(74) *Attorney, Agent, or Firm* — XSENSUS LLP

(57) ABSTRACT

A liquid discharge apparatus includes a liquid discharge head configured to discharge a liquid, and a drive waveform generator configured to generate a drive waveform to be applied to the liquid discharge head, the drive waveform including a first discharge pulse to cause the liquid discharge head to discharge the liquid, a second discharge pulse after the first discharge pulse, the second discharge pulse to cause the liquid discharge head to discharge the liquid, and a pulse interval between the first discharge pulse and the second discharge pulse, the pulse interval being equal to a time period in which the liquid is discharged by the second discharge pulse in a damping state in which the second discharge pulse is damped by a meniscus vibration generated by the first discharge pulse.

14 Claims, 10 Drawing Sheets

(56) References Cited

U.S. PATENT DOCUMENTS

| | | | |
|---|---|---|---|
| 2014/0285554 | A1 | 9/2014 | Yanaka et al. |
| 2015/0375504 | A1 | 12/2015 | Kitaoka et al. |
| 2019/0283414 | A1 | 9/2019 | Yoshida |
| 2021/0001629 | A1 | 1/2021 | Yoshida |

FOREIGN PATENT DOCUMENTS

| | | |
|---|---|---|
| JP | 2012-250477 | 12/2012 |
| JP | 2014-151502 | 8/2014 |

* cited by examiner

LIQUID DISCHARGE APPARATUS, DRIVE WAVEFORM GENERATOR, AND HEAD DRIVE METHOD

CROSS-REFERENCE TO RELATED APPLICATION

This patent application is based on and claims priority pursuant to 35 U.S.C. § 119(a) to Japanese Patent Application No. 2020-197468, filed on Nov. 27, 2020, in the Japan Patent Office, the entire disclosures of which is hereby incorporated by reference herein.

BACKGROUND

Technical Field

Aspects of the present disclosure relate to a liquid discharge apparatus, a drive waveform generator, and a head drive method.

Related Art

A drive pulse (discharge pulse) is used to drive a liquid discharge head. For example, the drive pulse applies a contraction waveform element that contracts a pressure chamber at a timing at which liquid discharge operations resonates in accordance with a phase of a period (Helmholtz period) of meniscus vibration generated by an expansion waveform element that expands the pressure chamber.

Further, a second drive pulse is applied so that a phase of the meniscus vibration excited by a liquid discharge by a first drive pulse to be matched with a phase of the meniscus vibration excited by a liquid discharge by a second drive pulse to form a large liquid droplet by a plurality of drive pulses (discharge pulses).

SUMMARY

In an aspect of this disclosure, a liquid discharge apparatus includes a liquid discharge head configured to discharge a liquid, and a drive waveform generator configured to generate a drive waveform to be applied to the liquid discharge head, the drive waveform including a first discharge pulse to cause the liquid discharge head to discharge the liquid, a second discharge pulse after the first discharge pulse, the second discharge pulse to cause the liquid discharge head to discharge the liquid, and a pulse interval between the first discharge pulse and the second discharge pulse, the pulse interval being equal to a time period in which the liquid is discharged by the second discharge pulse in a damping state in which the second discharge pulse is damped by a meniscus vibration generated by the first discharge pulse.

BRIEF DESCRIPTION OF THE SEVERAL VIEWS OF THE DRAWINGS

The aforementioned and other aspects, features, and advantages of the present disclosure will be better understood by reference to the following detailed description when considered in connection with the accompanying drawings, wherein.

Figure 1:
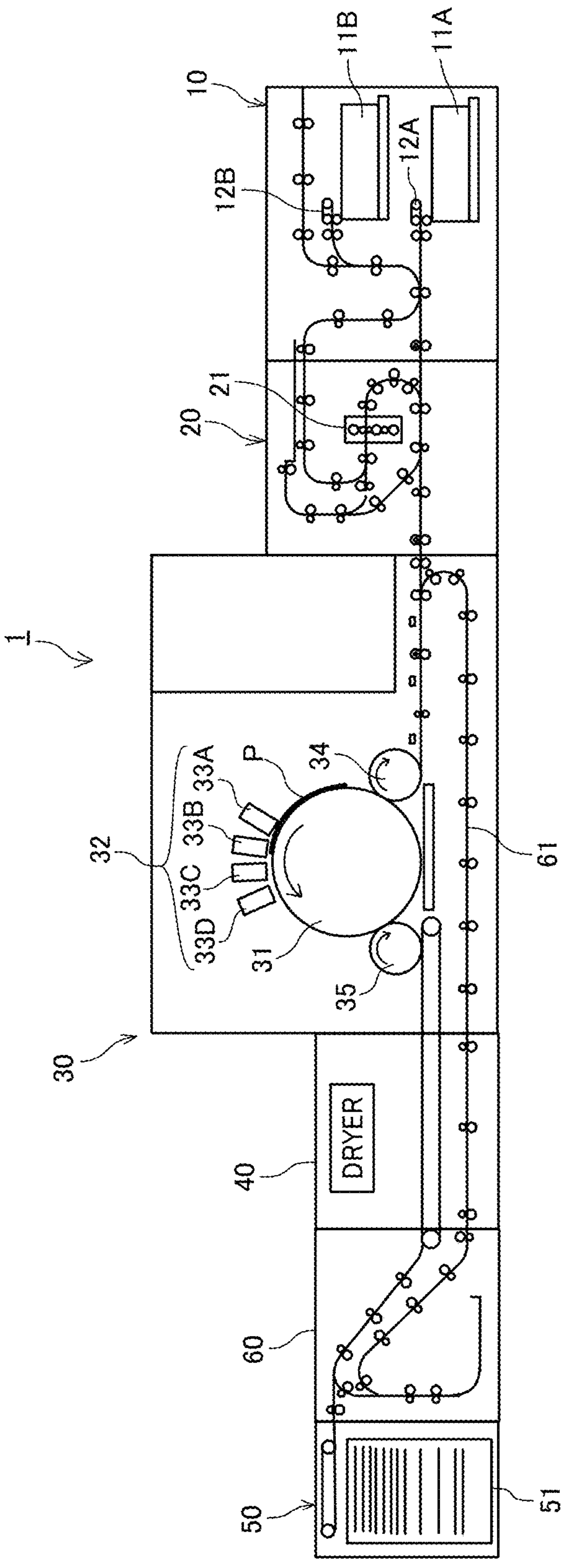
FIG. 1 is a schematic cross-sectional side view of a printer as a liquid discharge apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms “a”, “an”, and “the” are intended to include the plural forms as well, unless the context clearly indicates otherwise.

Referring now to the drawings, wherein like reference numerals designate identical or corresponding parts throughout the several views, embodiments of the present disclosure are described below. A printer 1 as a liquid discharge apparatus according to a first embodiment of the present disclosure is described with reference to FIGS. 1 and 2.

FIG. 1 is a schematic side view of the printer 1 according to the first embodiment.

Figure 2:
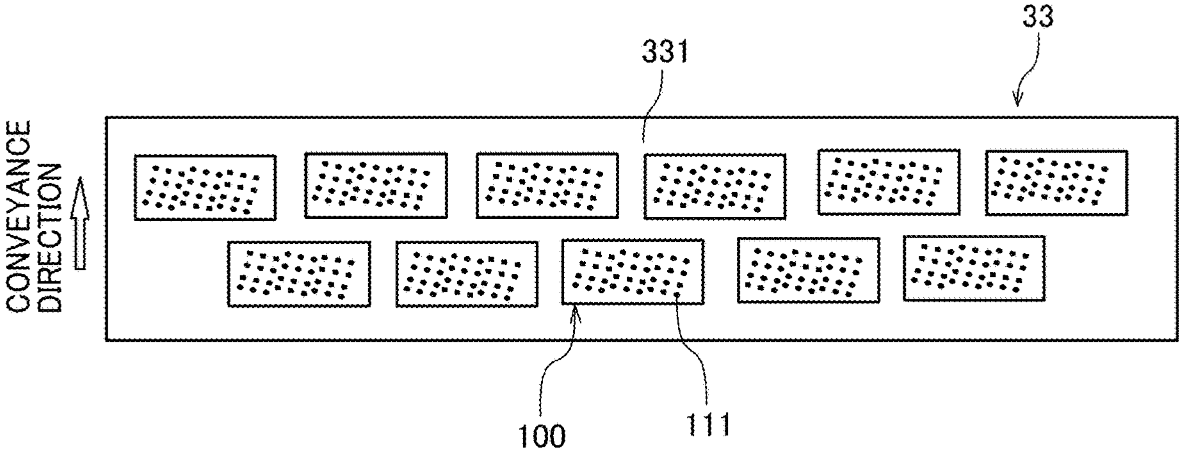
FIG. 2 is a plan view illustrating a discharging unit of the printer of FIG. 1.

FIG. 2 is a schematic plan view of a discharge unit 33 of the printer 1.

A printer 1 according to the first embodiment includes a loading unit 10 to load a sheet P into the printer 1, a pretreatment unit 20, a printing unit 30, a drying unit 40, a reverse unit 60, and an ejection unit 50.

In the printer 1, the pretreatment unit 20 applies, as desired, a pretreatment liquid onto the sheet P fed (supplied) from the loading unit 10, the printing unit 30 applies liquid to the sheet P to perform desired printing, the drying unit 40 dries the liquid adhering to the sheet P, and the sheet P is ejected to the ejection unit 50. The pretreatment unit 20 serves as a "pretreatment device".

The loading unit 10 includes loading trays 11 (a lower loading tray 11A and an upper loading tray 11B) to accommodate multiple sheets P and feeding devices 12 (a feeding device 12A and a feeding device 12B) to separate and feed the multiple sheets P one by one from the loading trays 11, and supplies the sheet P to the pretreatment unit 20.

The pretreatment unit 20 includes, e.g., a coater 21 as a treatment-liquid application unit that coats a printing surface of a sheet P with a treatment liquid having an effect of aggregation of ink particles to prevent bleed-through.

The printing unit 30 includes a drum 31 and a liquid discharge device 32. The drum 31 is a bearer (rotating member) that bears the sheet P on a circumferential surface of the drum 31 and rotates. The liquid discharge device 32 discharges liquid toward the sheet P borne on the drum 31.

The printing unit 30 further includes transfer cylinders 34 and 35. The transfer cylinder 34 receives the sheet P fed from the pretreatment unit 20 and forwards the sheet P to the drum 31. The transfer cylinder 35 receives the sheet P conveyed by the drum 31 and forwards the sheet P to the drying unit 40.

The transfer cylinder 34 includes a sheet gripper to grip a leading end of the sheet P conveyed from the pretreatment unit 20 to the printing unit 30. The sheet P thus gripped is conveyed as the transfer cylinder 34 rotates. The transfer cylinder 34 forwards the sheet P to the drum 31 at a position opposite the drum 31.

Similarly, the drum 31 includes a sheet gripper on a surface of the drum 31, and the leading end of the sheet P is gripped by the sheet gripper of the drum 31. The drum 31 includes multiple suction holes dispersed on the surface of the drum 31, and a suction unit generates suction airflow directed from desired suction holes of the drum 31 to an interior of the drum 31.

The sheet gripper of the drum 31 grips the leading end of the sheet P forwarded from the transfer cylinder 34 to the drum 31, and the sheet P is attracted to and borne on the drum 31 by the suction airflows by the suction device. As the drum 31 rotates, the sheet P is conveyed.

The liquid discharge device 32 includes discharge units 33 (discharge units 33A to 33D) as liquid dischargers to discharge liquids. For example, the discharge unit 33A discharges a liquid of cyan (C), the discharge unit 33B discharges a liquid of magenta (M), the discharge unit 33C discharges a liquid of yellow (Y), and the discharge unit 33D discharges a liquid of black (K), respectively. Further, the discharge unit 33 may discharge a special liquid, that is, a liquid of spot color such as white, gold, or silver.

As illustrated in FIG. 2, for example, the discharge unit 33 is a full line head and includes multiple liquid discharge heads 100 according to the embodiments of the present disclosure. The multiple liquid discharge heads 100 are arranged in a staggered manner on a base 331. Each of the liquid discharge head 100 includes multiple nozzles 111 arranged in a two-dimensional matrix. Hereinafter, the "liquid discharge head" is simply referred to as a "head".

The printer 1 controls a discharge operation of each of the discharge units 33 of the liquid discharge device 32 by a drive signal corresponding to print data. When the sheet P borne on the drum 31 passes through a region facing the liquid discharge device 32, the liquids of respective colors are discharged from the discharge units 33, and an image corresponding to the print data is formed on the sheet P.

The drying unit 40 dries the liquid adhered onto the sheet P by the printing unit 30. As a result, a liquid component such as moisture in the liquid evaporates, and the colorant contained in the liquid is fixed on the sheet P. Additionally, curling of the sheet P is restrained.

The reverse unit 60 reverses, in switchback manner, the sheet P that has passed through the drying unit 40 in double-sided printing. The reversed sheet P is fed back to an upstream of the transfer cylinder 34 through a conveyance passage 61 of the printing unit 30.

The ejection unit 50 includes the ejection tray 51 on which the multiple sheets P are stacked. The multiple sheets P conveyed through the reverse unit 60 from the drying unit 40 is sequentially stacked and held on an ejection tray 51.

Next, an example of the head 100 of the discharge unit 33 is described with reference to FIGS. 3 to 8.

Figure 3:
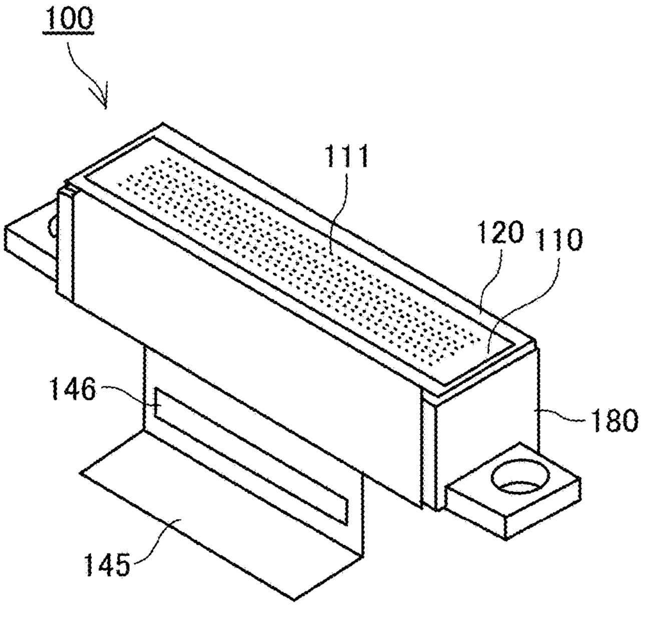
FIG. 3 is an external perspective view of an example of a liquid discharge head in the first embodiment as viewed from a nozzle surface side.

FIG. 3 is an outer perspective view of the head 100 viewed from a nozzle surface side according to the first embodiment.

Figure 4:
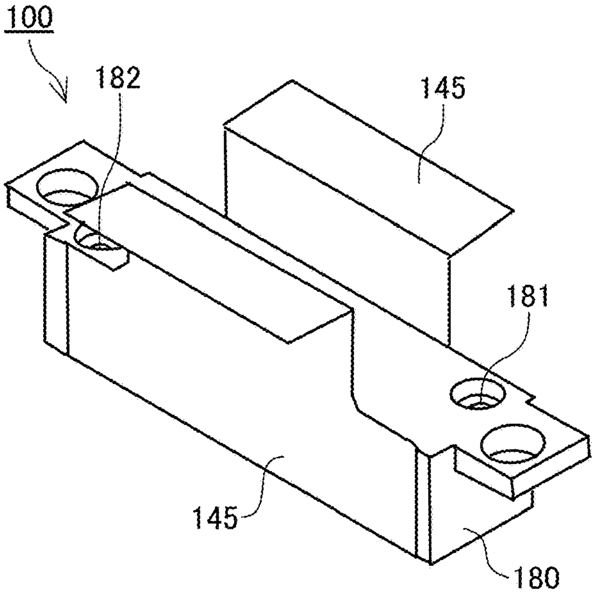
FIG. 4 is an outer perspective view of the liquid discharge head viewed from an opposite side of the nozzle surface side according to the first embodiment of the present disclosure.

FIG. 4 is an outer perspective view of the head 100 viewed from an opposite side of the nozzle surface side according to the first embodiment.

Figure 5:
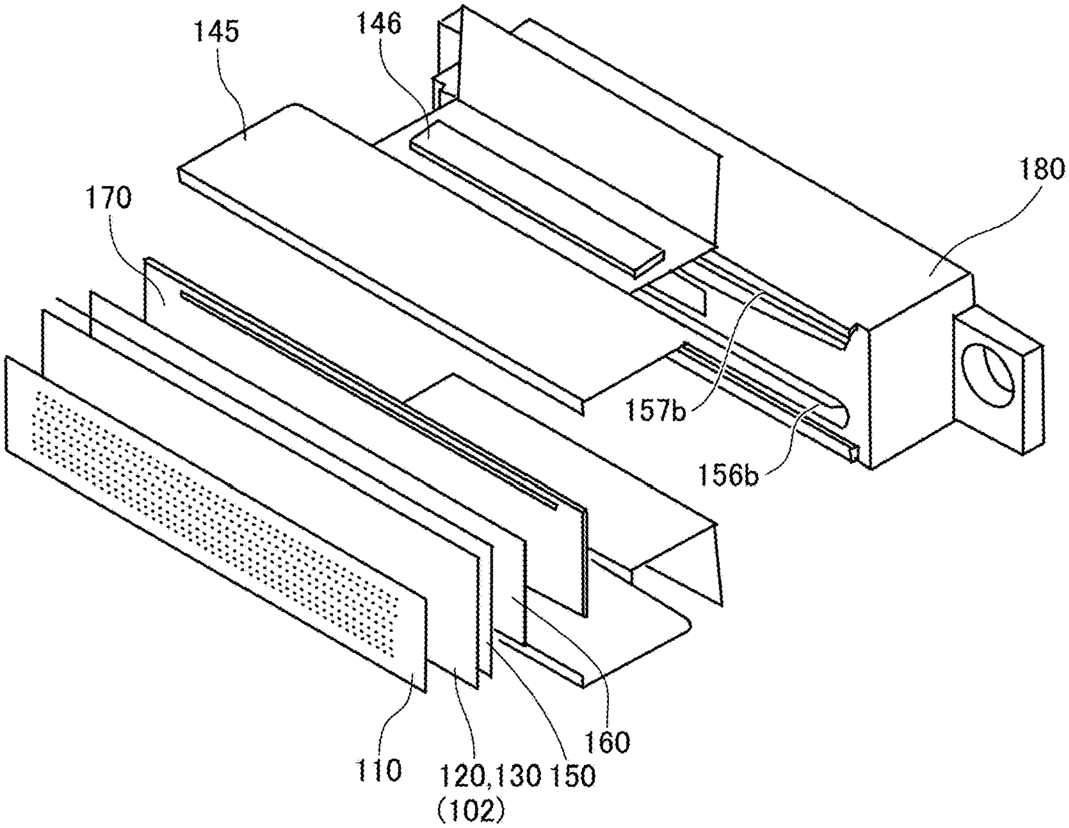
FIG. 5 is an exploded perspective view of the head 100 of FIGS. 3 and 4.

FIG. 5 is an exploded perspective view of the head 100 of FIGS. 3 and 4.

Figure 6:
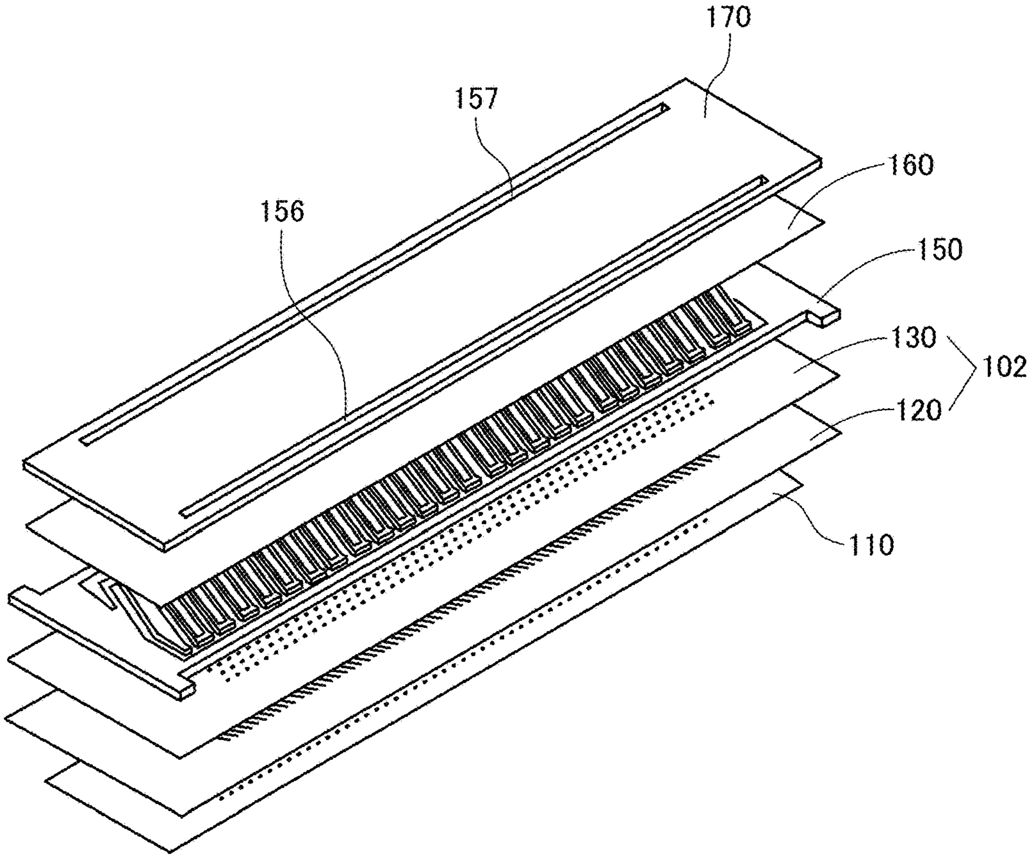
FIG. 6 is an exploded perspective view of a channel forming member of the liquid discharge head according to the first embodiment of the present disclosure.

FIG. 6 is an exploded perspective view of a channel forming member of the head 100 according to the first embodiment.

Figure 7:
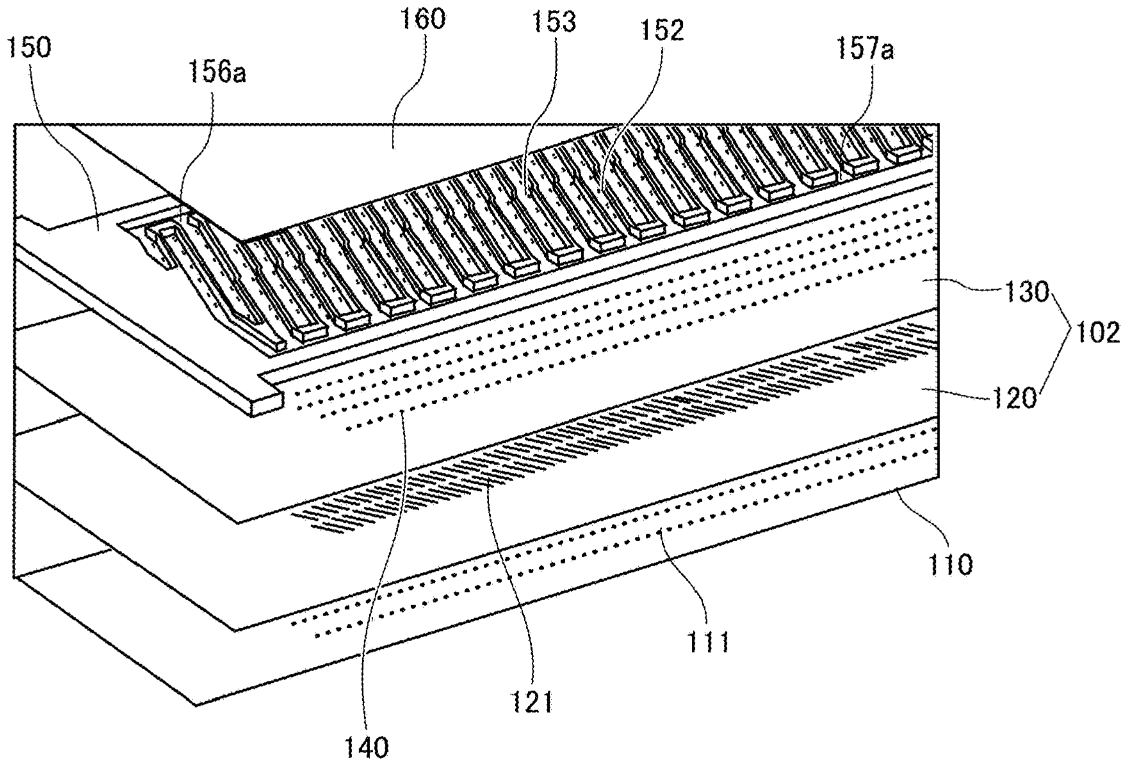
FIG. 7 is an enlarged perspective view of a portion of the channel forming member of FIG. 6.

FIG. 7 is an enlarged perspective view of a portion of the channel forming member of FIG. 6.

Figure 8:
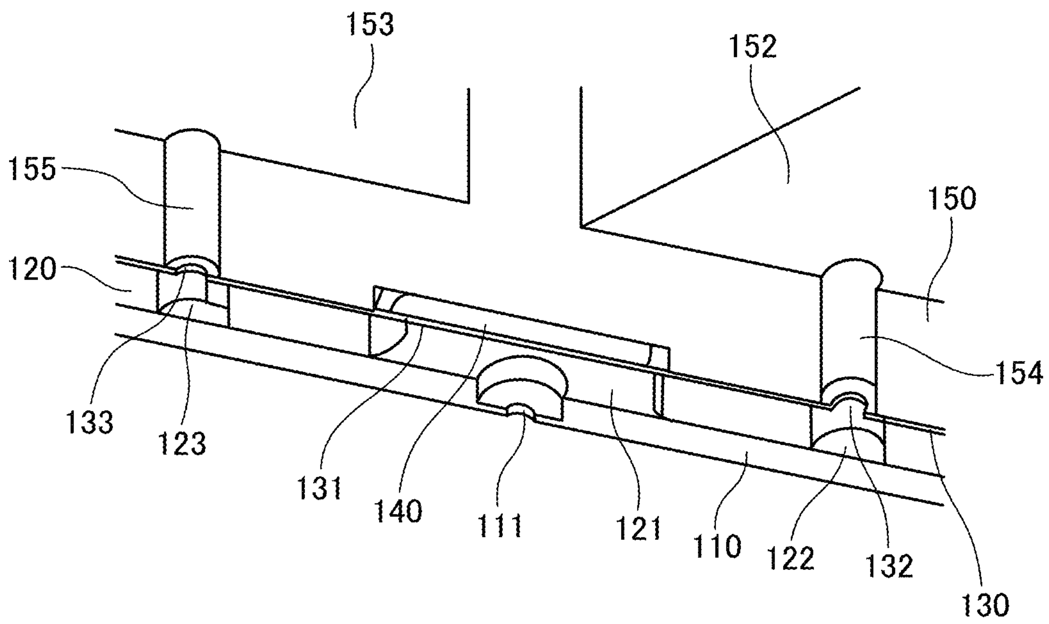
FIG. 8 is a cross-sectional perspective view of channels in the liquid discharge head according to the first embodiment of the present disclosure.

FIG. 8 is a cross-sectional perspective view of channels in the channel forming member of the head 100.

The head 100 includes a nozzle plate 110, a channel plate 120 (individual channel member), a diaphragm member 130, a common-branch channel member 150, a damper 160, a common-main channel member 170, a frame 180, and a flexible wiring 145 (wiring member) as illustrated in FIG. 5. The head 100 includes a head driver 146 mounted on the flexible wiring 145 (wiring member). The head driver 146 is also referred to as a "driver integrated circuit (driver IC)". The head 100 in the first embodiment includes an actuator substrate 102 formed by the channel plate 120 (individual channel member) and the diaphragm member 130 (see FIG. 5).

The nozzle plate 110 includes multiple nozzles 111 to discharge a liquid. The multiple nozzles 111 are arrayed in a two-dimensional matrix (see FIG. 2).

The channel plate 120 includes multiple pressure chambers 121 (individual chambers) respectively communicating with the multiple nozzles 111, multiple individual supply channels 122 respectively communicating with the multiple pressure chambers 121, and multiple individual collection channels 123 respectively communicating with the multiple pressure chambers 121 (see FIGS. 7 and 8).

The diaphragm member 130 forms a diaphragm 131 serving as a deformable wall of the pressure chamber 121, and the piezoelectric element 140 is formed on the diaphragm 131 so that the piezoelectric element 140 and the diaphragm 131 form a single body. Further, the diaphragm member 130 includes a supply opening 132 that communicates with the individual supply channel 122 and a collection opening 133 that communicates with the individual collection channel 123 (see FIG. 8). The piezoelectric element 140 is a pressure generator to deform the diaphragm 131 to pressurize the liquid in the pressure chamber 121.

The common-branch channel member 150 includes multiple common-supply branch channels 152 each communicating with two or more individual supply channels 122 and multiple common-collection branch channels 153 each communicating with two or more individual collection channels 123. The multiple common-supply branch channels 152 and the multiple common-collection branch channels 153 are arranged alternately adjacent to each other (see FIGS. 7 and 8).

As illustrated in FIG. 8, the common-branch channel member 150 includes a through hole serving as a supply port 154 that connects the supply opening 132 of the individual supply channel 122 and the common-supply branch channel 152, and a through hole serving as a collection port 155 that connects the collection opening 133 of the individual collection channel 123 and the common-collection branch channel 153.

The common-branch channel member 150 includes a part 156*a* of one or more common-supply main channels 156 each communicating with the multiple common-supply branch channels 152, and a part 157*a* of one or more common-collection main channels 157 each communicating with the multiple common-collection branch channels 153 (see FIGS. 3 to 5).

As illustrated in FIGS. 7 and 8, the damper 160 includes a supply damper that faces (opposes) the supply port 154 of the common-supply branch channel 152 and a collection damper that faces (opposes) the collection port 155 of the common-collection branch channel 153.

As illustrated in FIG. 7, the damper 160 seals grooves alternately arrayed in the same common-branch channel member 150 to form the common-supply branch channels 152 and the common-collection branch channels 153. The damper 160 forms a deformable wall of the common-supply branch channels 152 and the common-collection branch channels 153.

The common-main channel member 170 forms a common-supply main channel 156 that communicates with the multiple common-supply branch channels 152 and a common-collection main channel 157 that communicate with the multiple common-collection branch channels 153 (see FIGS. 6 and 7).

The frame 180 includes the part 156*b* of the common-supply main channel 156 and the part 157*b* of the common-collection main channel 157 (see FIGS. 5 and 6). The part 156*b* (see FIG. 5) of the common-supply main channel 156 (see FIG. 6) communicates with the supply port 181 (see FIG. 4) in the frame 180. The part 157*b* (see FIG. 5) of the common-collection main channel 157 (see FIG. 6) communicates with the collection port 182 (see FIG. 4) in the frame 180.

In the head 100, the piezoelectric element 140 is bent and deformed to pressurize the liquid in the pressure chamber 121 in response to an application of a drive pulse to the piezoelectric element 140, so that a liquid is discharged from the nozzle 111 as a liquid droplet.

Next, a section related to a head drive controller 400 that drives the head is described with reference to a block diagram of FIG. 9.

Figure 9:
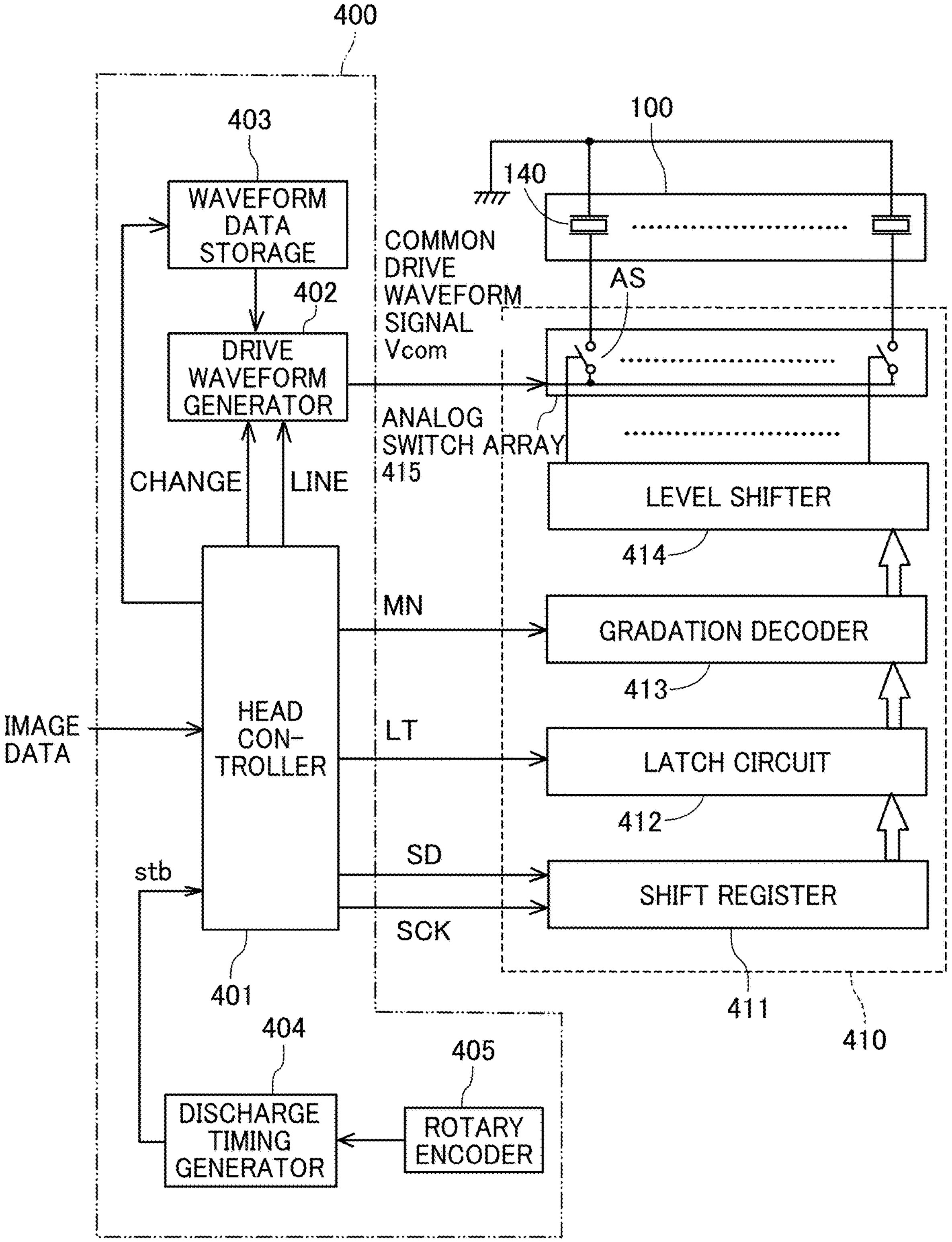
FIG. 9 is a block diagram of a head drive controller to drive the liquid discharge head of the printer.

FIG. 9 is a block diagram of the head drive controller 400 to drive the head 100 of the printer 1.

The head drive controller 400 applies a drive waveform Va (see FIG. 10) to the head 100. The head drive controller 400 includes a head controller 401, a drive waveform generator 402 and a waveform data storage 403 that form a drive waveform generator, a head driver 410, and a discharge timing generator 404 to generate a discharge timing.

In response to a reception of a discharge timing pulse stb, the head controller 401 outputs a discharge synchronization signal LINE that triggers generation of the drive waveform Va, to the drive waveform generator 402. The head controller 401 outputs a discharge timing signal CHANGE corresponding to an amount of delay from the discharge synchronization signal LINE, to the drive waveform generator 402.

The drive waveform generator 402 serves as a drive waveform generator according to the first embodiment to generate the drive waveform Va. The drive waveform generator 402 generates a common drive waveform signal Vcom at a timing based on the discharge synchronization signal LINE and the discharge timing signal CHANGE.

The head controller 401 receives image data and generates a mask control signal MN based on the image data. The mask control signal MN is used for selecting a predetermined waveform of the common drive waveform signal Vcom according to a size of the liquid droplet to be discharged from each nozzle 111 of the head 100. The mask control signal MN is a signal at a timing synchronized with the discharge timing signal CHANGE.

The head controller 401 transmits image data SD, a synchronization clock signal SCK, a latch signal LT instructing latch of the image data, and the generated mask control signal MN to the head driver 410.

The head driver 410 includes a shift register 411, a latch circuit 412, a gradation decoder 413, a level shifter 414, and an analog switch array 415.

The shift register 411 receives (inputs) the image data SD and the synchronization clock signal SCK transmitted from the head controller 401 and outputs a resister value to the latch circuit 412. The latch circuit 412 latches each resister value received from the shift register 411 by the latch signal LT transmitted from the head controller 401.

The gradation decoder 413 decodes a value (image data SD) latched by the latch circuit 412 and the mask control signal MN and outputs a result to the level shifter 414. The level shifter 414 converts a level of a logic level voltage signal of the gradation decoder 413 to a level at which an analog switch AS of the analog switch array 415 is operatable.

The analog switch AS of the analog switch array 415 is turned on or tuned off by an output from the gradation decoder 413 received via the level shifter 414. The head 100 includes the analog switches AS for the nozzles 111, respectively. The analog switches AS is connected to an individual electrode of the piezoelectric element 140 corresponding to each nozzle 111. The common drive waveform signal Vcom from the drive waveform generator 402 is input to the analog switch AS. A timing of the mask control signal MN is synchronized with a timing of the common drive waveform signal Vcom as described above.

Therefore, the analog switch AS is switched between on and off timely in accordance with the output from the gradation decoder 413 via the level shifter 414. With switching on and off of the analog switch AS, a drive pulse to be applied to the piezoelectric element 140 corresponding to each nozzle 111 is selected from drive pulses forming the common drive waveform signal Vcom. Thus, the drive waveform generator 402 can control the size of the liquid droplet discharged from the nozzle 111.

The discharge timing generator 404 generates and outputs the discharge timing pulse stb each time the sheet P is moved by a predetermined amount, based on a detection result of a rotary encoder 405 that detects a rotation amount of the drum 31. The rotary encoder 405 includes an encoder wheel that rotates together with the drum 31 and an encoder sensor that reads a slit of the encoder wheel.

Next, the drive waveform Va in the first embodiment of the present disclosure is described with reference to FIG. 10.

Figure 10:
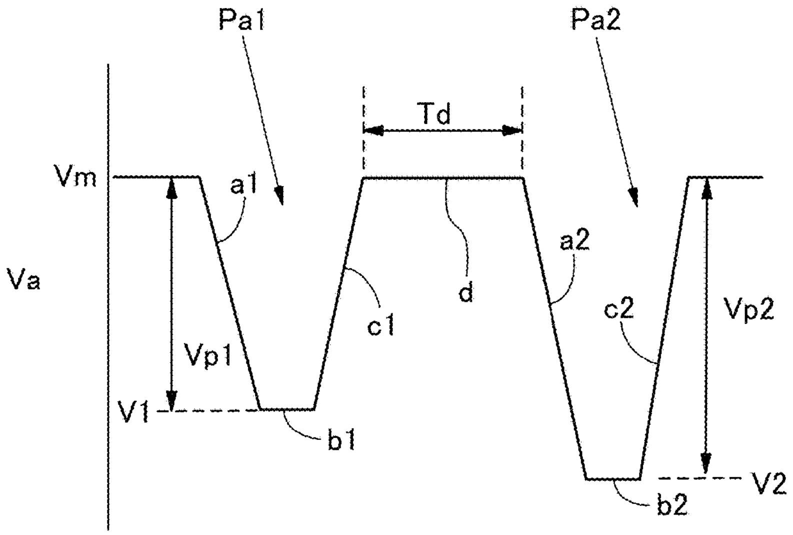
FIG. 10 is a graph illustrating a driving waveform in the first embodiment of the present disclosure.

FIG. 10 is a waveform chart of the drive waveform Va in the first embodiment.

The driving waveform Va according to the first embodiment includes a first discharge pulse Pa1 and a second discharge pulse Pa2. The first discharge pulse Pa1 pressurize the liquid in the pressure chamber 121 to a degree dischargeable from the nozzle 111. The second discharge pulse Pa2 pressurize the liquid in the pressure chamber 121 to a degree dischargeable from the nozzle 111. The first discharge pulse Pa1 as a preceding discharge pulse and the second discharge pulse Pa2 as a following discharge pulse are generated continuously in time series.

The first discharge pulse Pa1 includes an expansion waveform element a1 to expand the pressure chamber 121, a holding waveform element b1 to hold an expansion state of the pressure chamber 121 expanded by the expansion waveform element a1, and a contraction waveform element c1 to contract the pressure chamber 121 from a state held by the holding waveform element b1 to discharge a liquid.

The expansion waveform element a1 of the first discharge pulse Pa1 is a waveform falling from an intermediate potential Vm (or reference potential) to a potential V1. The holding waveform element b1 is a waveform holding the potential V1. The contraction waveform element c1 is a waveform rising from the potential V1 to the intermediate potential Vm. A peak value of the first discharge pulse Pa1 is Vp1.

The second discharge pulse Pa2 includes an expansion waveform element a2 to expand the pressure chamber 121, a holding waveform element b2 to hold an expansion state of the pressure chamber 121 expanded by the expansion waveform element a2, and a contraction waveform element c2 to contract the pressure chamber 121 from a state held by the holding waveform element b2 to discharge a liquid.

The expansion waveform element a2 of the second discharge pulse Pa2 is a waveform falling from the intermediate potential Vm (or reference potential) to a potential V2. The holding waveform element b2 is a waveform holding the potential V2. The contraction waveform element c2 is a waveform rising from the potential V2 to the intermediate potential Vm. A peak value of the discharge pulse Pa2 is Vp2 (Vp2>Vp1).

A waveform from an end point of the contraction waveform element c1 of the first discharge pulse Pa1 to a start point of the expansion waveform element a2 of the second discharge pulse Pa2 is defined as an inter-pulse holding waveform element "d". A time (period) of the inter-pulse holding waveform element "d" is defined as a pulse interval Td between the first discharge pulse P1 and the second discharge pulse P2.

The pulse interval Td between a preceding first discharge pulse Pa1 and a succeeding second discharge pulse Pa2 is equal (set) to a time period in which the liquid is discharged by the second discharge pulse Pa2 in a damping state. In this damping state (antiresonance state), the second discharge pulse Pa2 is damped by (nonresonant with) a meniscus vibration of the liquid in the nozzle 111 associated with liquid discharge by the first discharge pulse Pa1. The damping state is also referred to as "an antiresonance state" in which the second discharge pulse Pa2 is nonresonant with (does not resonate with) the meniscus vibration generated by the first discharge pulse Pa1.

Thus, the printer 1 (liquid discharge apparatus) includes the head 100 (liquid discharge head) configured to discharge a liquid; and the drive waveform generator 402 configured to generate a drive waveform to be applied to the liquid discharge head. The drive waveform includes the first discharge pulse Pa1 configured to cause the head 100 (liquid discharge head) to discharge the liquid, and the second discharge pulse Pa2 after the first discharge pulse Pa2, the second discharge pulse Pa2 configured to cause the head 100 (liquid discharge head) to discharge the liquid. A pulse interval between the first discharge pulse Pa1 and the second discharge pulse Pa2 is equal (set) to a time period in which the liquid is discharged by the second discharge pulse Pa2 in a damping state in which the second discharge pulse Pa2 is damped by a meniscus vibration generated by the first discharge pulse Pa1.

A case in which a speed of a liquid droplet discharged by a succeeding second discharge pulse Pa2 is increased by a meniscus vibration caused by a preceding first discharge pulse Pa1 is referred to as a "resonant state". A case in which the speed of the liquid droplet discharged by a succeeding second discharge pulse Pa2 is decreased by the meniscus vibration caused by the preceding first discharge pulse Pa1 is referred to as a "damping state" (nonresonant state or antiresonance state).

A timing at which liquid is discharged in the resonant state is referred to as a "resonant timing". The timing at which the liquid is discharged in the damping state is referred to as a "damping timing" (nonresonant timing or antiresonance timing).

A "resonance" means a predetermined range including a maximum value, and "antiresonance" means a predetermined range including a minimum value in the first embodiment. For example, the resonant state (resonant timing) occurs within a range of Tc±1/4 Tc, the damping state (nonresonant timing) occurs within a range of 1.5 Tc±1/4 Tc, and the resonant state (resonant timing) occurs within a range of 2 Tc±1/4 Tc where a natural vibration cycle of the pressure chamber 121 is referred to as "Tc".

Next, an operational effect of the head drive controller 400 according to the first embodiment is described below with reference to FIG. 11.

Figure 11:
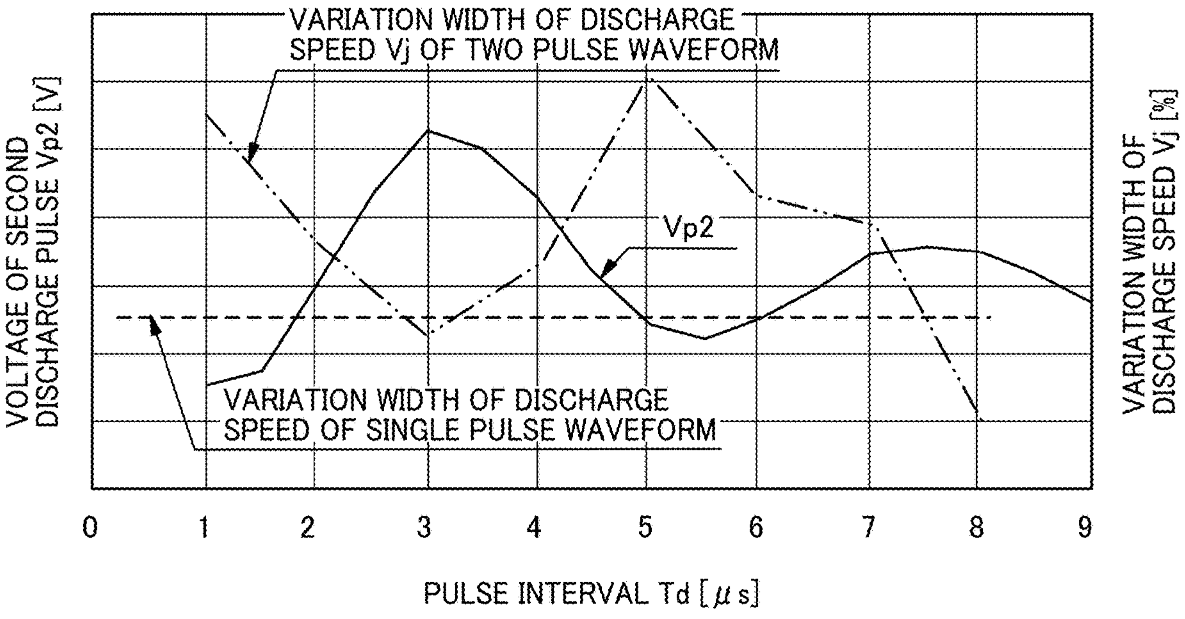
FIG. 11 is a graph illustrating an example of a relation between a variation width in a discharge speed of the liquid and a voltage of a second discharge pulse with respect to the pulse interval illustrating an operational effect in the first embodiment.

FIG. 11 is a graph illustrating an example of a relation between a variation width in a discharge speed of the liquid and a voltage Vp2 of the second discharge pulse with respect to the pulse interval Td in the first embodiment.

The voltage Vp1 of the first discharge pulse Pa1 was fixed, and the voltage Pa2 of the second discharge pulse Vp2 was changed to measure a change in a discharge speed of a liquid droplet generated by merging of a liquid droplet discharged by the first discharge pulse Pa1 and a liquid droplet discharged by the second discharge pulse Pa2. Results of measurement are illustrated in FIG. 11.

A "two pulse waveform" in FIG. 11 indicates a waveform generated by a liquid discharge operation performed by merging the first discharge pulse Pa1 and the second discharge pulse Pa2. A "single pulse waveform" in FIG. 11 indicates a waveform generated by a liquid discharge operation performed by one pulse (single pulse).

It can be seen that the voltage Vp2 of the second discharge pulse Pa2 changes at a constant cycle in accordance with a residual vibration of the menisci caused by the liquid discharge operation by the first discharge pulse Vp2 from the result indicated in FIG. 11.

It can be seen that the timing at which the voltage Vp2 becomes low is a timing (Td=1 μs and 5.5 μs) at which the voltage Vp2 of the second discharge pulse Pa2 resonates with the residual vibration caused by the first discharge pulse Pa1. Conversely, it can be seen that the timing at which the voltage Vp2 becomes high is a timing (Td=3 μs and 7.5 μs) at which the voltage Vp2 of the second discharge pulse Pa2 is nonresonant with (does not resonate with) the residual vibration caused by the first discharge pulse Pa1.

A variation width in a discharge speed Vj in the two pulse waveform is larger than a variation width of the discharge speed Vj in the single pulse waveform at many timings when the variation width of the discharge speed Vj in a nozzle group at the resonant timing and the damping timing is observed.

However, the variation width in the discharge speed Vj in the two pulse waveform can be equal to or less than the variation width in the discharge speed Vj in the single pulse waveform in the damping timing (Td=3 μs and 7.5 μs to 8 μs) at which the first discharge pulse Pa1 and the second discharge pulse Pa2 do not resonate.

As described above, the pulse interval Td between the discharge pulse Pa1 and the second discharge pulse Pa2 is equal (set) to a time period during which the liquid discharge operation by the second discharge pulse Pa2 is performed in the damping state (nonresonant state). In this damping state, the second discharge pulse Pa2 is damped by (is nonresonant with) the meniscus vibration generated by the first discharge pulse Pa1.

That is, a head drive method according to the first embodiment generates the drive waveform Va to be applied to the head 100 and applies the drive waveform Va to the head 100 to discharge a liquid. In this head drive method according to the first embodiment, the drive waveform Va includes at least two discharge pulses (first discharge pulse Pa1 and second discharge pulse Pa2) to discharge liquid in a time series. In this head drive method according to the first embodiment, the pulse interval Td between the two discharge pulses (first discharge pulse Pa1 and second discharge pulse Pa2) is a time period in which a liquid discharged operation is performed by the succeeding second discharge pulse Pa2 in the damping state. In this damping state, the meniscus vibration generated by the preceding discharge pulse Pa1 is damped (reduced or controlled).

Thus, the drive waveform generator 402 can reduce a variation width in the discharge speed in a nozzle group including nozzles 111 communicating with same common channel. The drive waveform generator 402 can reduce a variation width in the discharge speed in main channels and branch channels in a configuration in which the head 100 includes common main channels (common-supply main channel 156 and common-collection main channel 157) and common branch channels (common-supply branch channel 152 and common-collection branch channel 153) as common channels in the head 100 according to the first embodiment.

Next, the drive waveform Va in the second embodiment of the present disclosure is described with reference to FIG. 12.

Figure 12:
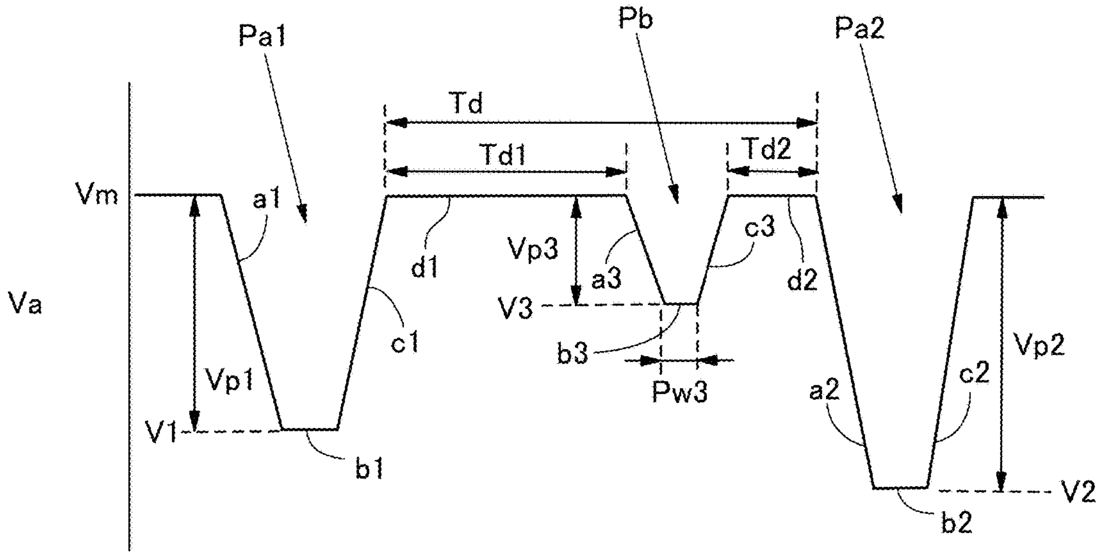
FIG. 12 is a graph illustrating a driving waveform in a second embodiment of the present disclosure.

FIG. 12 is a waveform chart of the drive waveform Va in the second embodiment.

The driving waveform Va according to the first embodiment includes a first discharge pulse Pa1, a non-discharge pulse Pb, and a second discharge pulse Pa2. The first discharge pulse Pa1 pressurize the liquid in the pressure chamber 121 to a degree dischargeable from the nozzle 111. The non-discharge pulse Pb pressurize the liquid in the pressure chamber 121 to a degree not to be discharged from the nozzle 111. The second discharge pulse Pa2 pressurize the liquid in the pressure chamber 121 to a degree dischargeable from the nozzle 111. The first discharge pulse Pa1, the non-discharge pulse Pb, and the second discharge pulse Pa2 are generated continuously in time series.

The first discharge pulse Pa1 includes an expansion waveform element a1 to expand the pressure chamber 121, a holding waveform element b1 to hold an expansion state of the pressure chamber 121 expanded by the expansion waveform element a1, and a contraction waveform element c1 to contract the pressure chamber 121 from a state held by the holding waveform element b1 to discharge a liquid.

The expansion waveform element a1 of the first discharge pulse Pa1 is a waveform falling from an intermediate potential Vm (or reference potential) to a potential V1. The holding waveform element b1 is a waveform holding the potential V1. The contraction waveform element c1 is a waveform rising from the potential V1 to the intermediate potential Vm. A peak value of the first discharge pulse Pa1 is Vp1.

The second discharge pulse Pa2 includes an expansion waveform element a2 to expand the pressure chamber 121, a holding waveform element b2 to hold an expansion state of the pressure chamber 121 expanded by the expansion waveform element a2, and a contraction waveform element c2 to contract the pressure chamber 121 from a state held by the holding waveform element b2 to discharge a liquid.

The expansion waveform element a2 of the second discharge pulse Pa2 is a waveform falling from the intermediate potential Vm (or reference potential) to the potential V2. The holding waveform element b2 is a waveform holding the potential V2. The contraction waveform element c2 is a waveform rising from the potential V2 to the intermediate potential Vm. A peak value of the discharge pulse Pa2 is Vp2 (Vp2>Vp1).

The first discharge pulse Pa1 includes the expansion waveform element a1 configured to expand the pressure chamber 121, the holding waveform element b1 configured to hold an expansion state of the pressure chamber 121 expanded by the expansion waveform element a1, and the contraction waveform element c1 configured to contract the pressure chamber 121 from a state held by the holding waveform element b1, and a pulse interval of the holding waveform element b1 is equal (set) to a time period in which the liquid is discharged by the contraction waveform element c1 in the resonant state in which the contraction waveform element c1 resonates with a meniscus vibration generated by the expansion waveform element a1.

Further, the second discharge pulse Pa2 includes the expansion waveform element a2 configured to expand the pressure chamber 121; the holding waveform element b2 configured to hold an expansion state of the pressure chamber 121 expanded by the expansion waveform element a2, and the contraction waveform element c2 configured to contract the pressure chamber 121 from a state held by the holding waveform element b2, and a pulse interval of the holding waveform element b2 is equal (set) to a time period in which the liquid is discharged by the contraction waveform element c2 in the resonant state in which the contraction waveform element c2 resonates with a meniscus vibration generated by the expansion waveform element a2.

Thus, the drive waveform generator 402 sets the pulse interval of the holding waveform element c1 or c2 so that each drive pulse in the drive waveform cause the head 100 to discharge a liquid in the resonant state to reduce a drive voltage of the printer 1 even if the drive waveform as a whole drives the head 100 in the damping state (nonresonant state) that increase the drive voltage.

The pulse interval Td is defined as a time period from the end point of the contraction waveform element c1 of the first discharge pulse Pa1 to the start point of the expansion waveform element a2 of the second discharge pulse Pa2 as in the first embodiment.

The pulse interval Td between the preceding first discharge pulse Pa1 and the following second discharge pulse Pa2 is equal (set) to a time period in which the liquid is discharged by the second discharge pulse Pa2 in the damping state (damping timing or nonresonant timing). In this damping state (damping timing or nonresonant timing), the second discharge pulse Pa2 is damped by (nonresonant with) the meniscus vibration of the liquid in the nozzle 111 associated with the liquid discharge operation by the first discharge pulse Pa1.

The non-discharge pulse Pb includes an expansion waveform element a3 to expand the pressure chamber 121, a holding waveform element b3 to hold an expansion state of the pressure chamber 121 expanded by the expansion waveform element a3, and a contraction waveform element c3 to contract the pressure chamber 121 from a state held by the holding waveform element b3.

The expansion waveform element a3 of the non-discharge pulse Pb is a waveform falling from the intermediate potential Vm (or reference potential) to the potential V3. The holding waveform element b3 is a waveform holding the potential V3. The contraction waveform element c3 is a waveform rising from the potential V3 to the intermediate potential Vm. The peak value of the non-discharge pulse Pb is set to a voltage Vp3 ($Vp3<Vp1<Vp2$).

A period of the holding waveform element b3 of the non-discharge pulse Pb is defined as a pulse width Pw3. The pulse width Pw3 is shorter than the resonant timing of the meniscus vibration generated by the non-discharge pulse Pb. That is, the pulse width Pw3 is set shorter than a cycle of the meniscus vibration generated by the non-discharge pulse Pb.

Thus, the drive waveform generator 402 can shorten a waveform length of the non-discharge pulse Pb and a waveform length of the drive waveform Va.

A voltage changing time of the non-discharge pulse Pb is shorter than a voltage changing time of each of the first discharge pulse Pa1 and the second discharge pulse Pa2. The voltage changing time of the non-discharge pulse Pb is a changing time of the expansion waveform element a3 and the contraction waveform element c3. The voltage changing time of the first discharge pulse Pa1 is a changing time of the expansion waveform element a1 and the contraction waveform element c1. The voltage changing time of the second discharge pulse Pa2 is a changing time of the expansion waveform element a2 and the contraction waveform element c2.

Thus, the drive waveform generator 402 can shorten a waveform length of the non-discharge pulse Pb and a waveform length of the drive waveform Va.

A pulse interval Td2 is defined as a time period of an inter-pulse holding waveform element d2 from an end point of the contraction waveform element c3 of the non-discharge pulse Pb to a start point of the expansion waveform element a2 of the second discharge pulse Pa2. This pulse interval Td2 is a time period in which the liquid is discharged by the second discharge pulse Pa2 in the resonant state (resonant timing) in which the second discharge pulse Pa2 resonates with the meniscus vibration of the liquid in the nozzle 111 by the non-discharge pulse Pb.

A waveform from an end point of the contraction waveform element c1 of the first discharge pulse Pa1 to a start point of the expansion waveform element a3 of the non-discharge pulse Pb is defined as an inter-pulse holding waveform element d1. A time period of the inter-pulse holding waveform element d1 is defined as a pulse interval Td1 between the first discharge pulse Pa1 and the non-discharge pulse Pb.

The pulse interval Td1 is equal (set) to a time period at which the meniscus vibration of the pressure chamber 121 is generated by the non-discharge pulse Pb in the damping state (damping timing or nonresonant timing). In this damping state, the non-discharge pulse Pb is damped by (nonresonant with) the meniscus vibration of the liquid in the nozzles 111 associated with the liquid discharge operation by the first discharge pulse Pa1.

Accordingly, the drive waveform generator 402 can reliably prevent the liquid from being discharged by the non-discharge pulse Pb caused by the non-discharge pulse Pb resonating with the meniscus vibration generated by the first discharge pulse Pa1.

The drive waveform Va includes a non-discharge pulse Pb between the first discharge pulse Pa1 and the second discharge pulse (Pa2), and the non-discharge pulse Pb generates another meniscus vibration that does not cause the head 100 (liquid discharge head) to discharge the liquid.

Another pulse interval Td2 between the non-discharge pulse Pb and the second discharge pulse Pa2 is equal (set) to a time period in which the liquid is discharged by the second discharge pulse Pa2 in a resonant state in which the second discharge pulse Pa2 resonates with said another meniscus vibration generated by the non-discharge pulse Pb.

A still another pulse interval Td1 between the first discharge pulse Pa1 and the non-discharge pulse Pb is equal (set) to a time period in which said another meniscus vibration generated by the non-discharge pulse Pb is damped by the meniscus vibration generated by the first discharge pulse Pa1.

Next, an operation effect of the drive waveform Va according to the second embodiment is described below with reference to FIG. 13.

Figure 13:
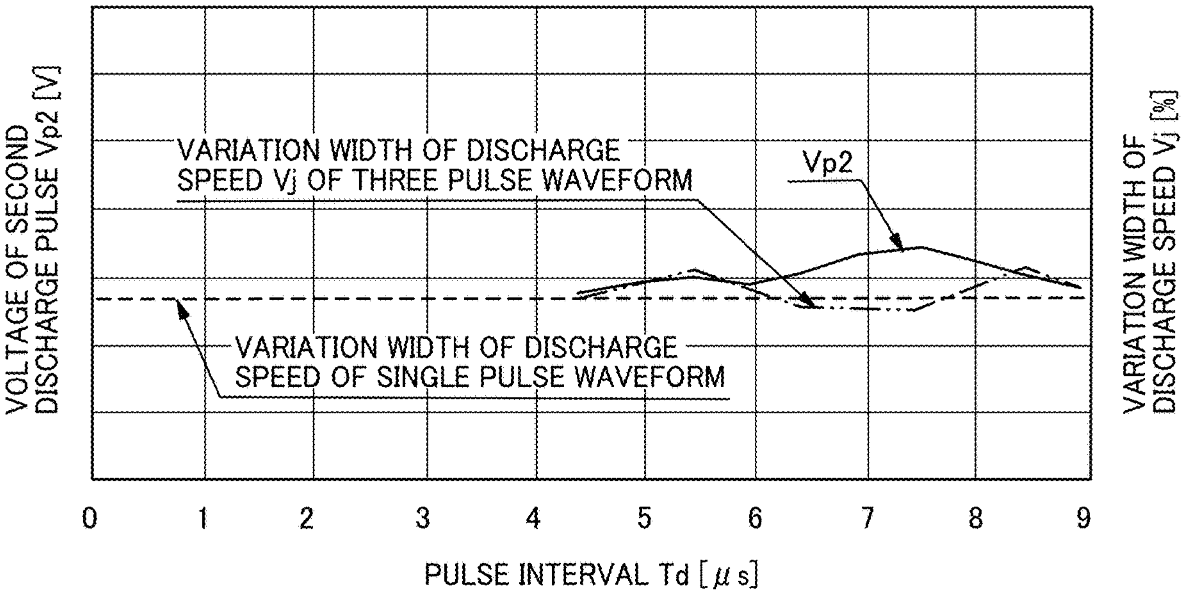
FIG. 13 is a graph illustrating an example of a relation between a variation width in a discharge speed and a voltage of the second discharge pulse with respect to the pulse interval illustrating an operational effect in the second embodiment.

FIG. 13 is a graph illustrating an example of a relation between a variation width in a discharge speed of the liquid and a voltage Vp2 of the second discharge pulse Pa2 with respect to the pulse interval Td in the second embodiment.

The voltage Vp1 of the first discharge pulse Pa1 was fixed, and the voltage Pa2 of the second discharge pulse Vp2 was changed to measure a change in a discharge speed of a liquid droplet generated by merging of a liquid droplet discharged by the first discharge pulse Pa1 and a liquid droplet discharged by the second discharge pulse Pa2. The results of the measurement are illustrated in FIG. 13.

The "three pulse waveform" in FIG. 13 indicates a liquid discharge operation using the first discharge pulse Pa1, the non-discharge pulse Pb, and the second discharge pulse Pa2. In the "three pulse waveform" in FIG. 13, the liquid is discharged by merging the first discharge pulse Pa1 and the second discharge pulse Pa2. A "single pulse waveform" in FIG. 11 indicates a waveform generated by a liquid discharge operation performed by one pulse (single pulse).

The variation width in the discharge speed Vj in the three pulse waveform can be equal to or less than the variation width of the discharge speed Vj in the single pulse waveform in the damping timing (Td=6 μs to 7.5 μs) at which the first discharge pulse Pa1 and the second discharge pulse Pa2 do not resonate as illustrated in FIG. 13.

Thus, the drive waveform generator 402 according to the second embodiment can reduce the voltage Vp2 of the second discharge pulse Pa2 to be smaller than the voltage Vp2 of the second discharge pulse Pa2 in the first embodiment width while the drive waveform generator 402 can control the variation width in the discharge speed Vj in the three pulse waveform to be equal to or less than the variation width of the discharge speed Vj in the single pulse waveform.

That is, the drive waveform generator 402 sets the discharge timing of the second discharge pulse Pa2 to be not resonant with the first discharge pulse Pa1 so that the second discharge pulse Pa2 is damped by the meniscus vibration generated by the first discharge pulse Pa1 to reduce the variation width in the discharge speed Vj as described in the first embodiment.

However, the voltage Vp2 of the second discharge pulse Vp2 has to be increased in the above case. When the voltage Vp2 of the second discharge pulse Pa2 is low, the liquid may not be discharged in the damping timing (nonresonant timing) in a following case such as, a head having a low displacement efficiency using a thin-film piezoelectric element is used, an apparatus having a restriction on an upper limit of a drive voltage is used, a high-viscosity liquid is discharged, an apparatus is used in a low-temperature environment, or the like.

Even if the liquid can be discharged by the second discharge pulse Pa2 having a low voltage Vp2, a voltage for applying a damping pulse to damp the residual vibration, a voltage for applying a post-processing pulse to shorten a ligament, or the like may become insufficient.

Therefore, the drive waveform generator 402 according to the second embodiment inserts the non-discharge pulse Pb before the second discharge pulse Pa2 and after the first discharge pulse Pa1, so that the liquid discharge operation by the second discharge pulse Pa2 is performed by using the meniscus vibration by the non-discharge pulse Pb.

The head drive method according to the second embodiment includes the non-discharge pulse Pb that does not discharge a liquid between two discharge pulses (first discharge pulse Pa1 and second discharge pulse Pa2) in the head drive method described in the first embodiment. In this head drive method according to the second embodiment, the pulse interval Td2 between the non-discharge pulse Pb and the second discharge pulse Pa2 succeeded to the non-discharge pulse Pb is a time period in which a liquid discharged operation is performed by the succeeding second discharge pulse Pa2 in the resonant state. In this resonant state, the succeeding second discharge pulse Pa2 resonates with the meniscus vibration generated by the preceding non-discharge pulse Pb.

Thus, the drive waveform generator 402 can cause the head 100 to discharge a liquid with reduced voltage Vp2 of the second discharge pulse Pa2 even in the following case such as, a head having a low displacement efficiency using a thin-film piezoelectric element is used, an apparatus having a restriction on an upper limit of a drive voltage is used, a high-viscosity liquid is discharged, an apparatus is used in a low-temperature environment, or the like.

Next, an example in which the pulse interval Td between the first discharge pulse Pa1 and the non-discharge pulse Pb is changed in the second embodiment is described with reference to FIG. 14.

Figure 14:
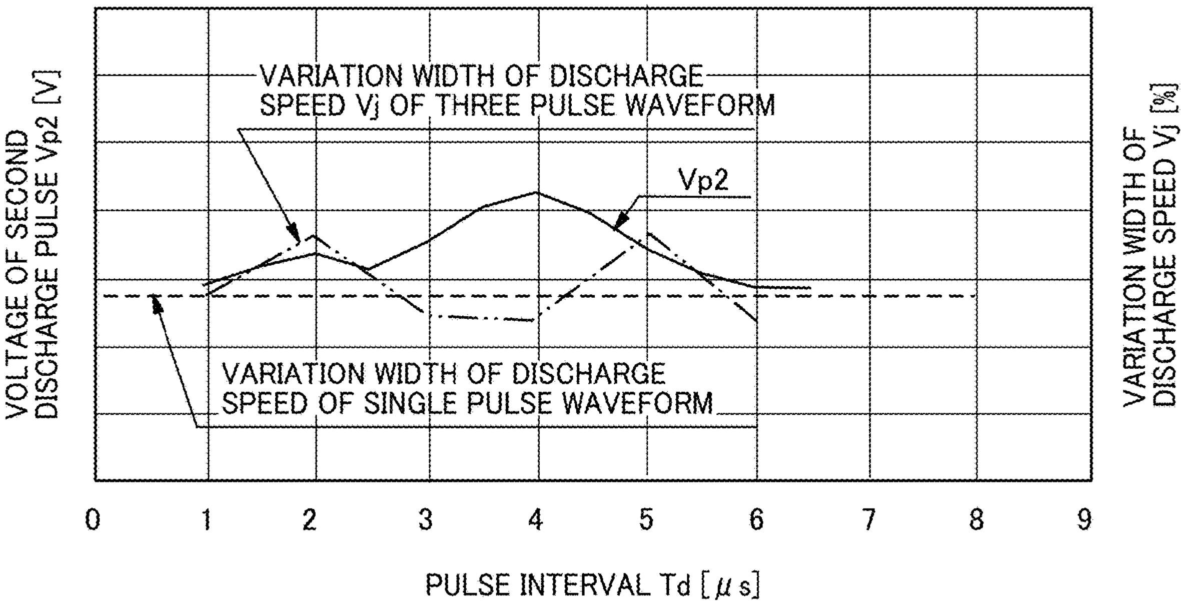
FIG. 14 is a graph illustrating an example of a relation between a variation width in a discharge speed and a voltage of the second discharge pulse in which the pulse interval between the first discharge pulse and the non-discharge pulse is changed in the second embodiment.

FIG. 14 is a graph illustrating an example of a relation between a variation width in a discharge speed Vj of the liquid and a voltage Vp2 of the second discharge pulse Pa2 with respect to the pulse interval Td in the second embodiment.

Here, the pulse interval Td1 between the first discharge pulse Pa1 and the non-discharge pulse Pb is varied, and the variation width in the discharge speed Vj is measured while adjusting the voltage Vp2 of the second discharge pulse Pa2 so that the discharge speed Vj of the merged liquid droplet becomes constant.

It can be seen from this result that the drive waveform generator 402 can reduce the voltage Vp2 of the second discharge pulse Pa2 and reduce the variation width in the discharge speed Vj as compared with the variation width of the discharge speed Vj of each of the first embodiment and the single pulse waveform.

Next, the drive waveform Va according to a third embodiment of the present disclosure is described with reference to FIG. 15.

Figure 15:
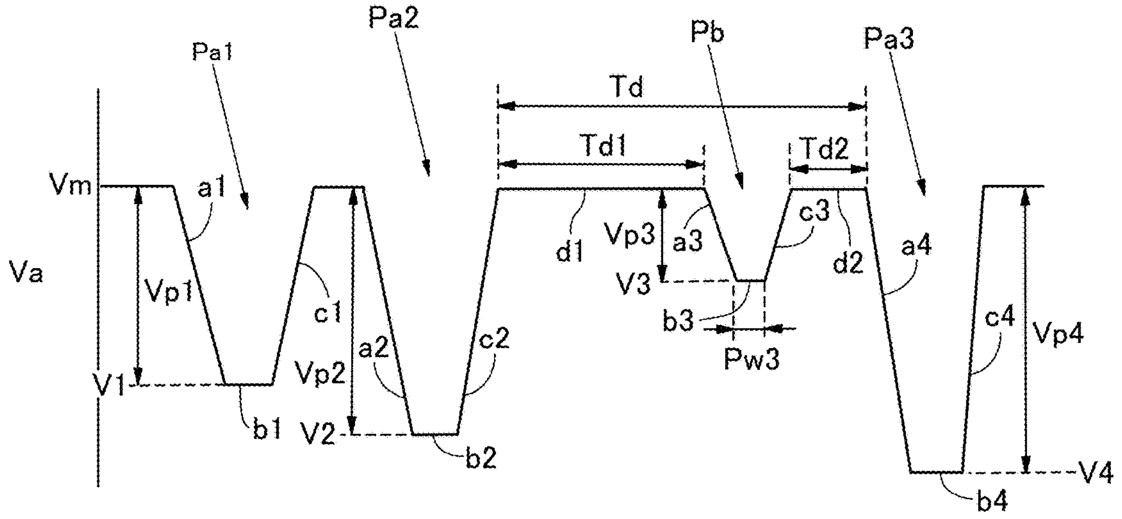
FIG. 15 is a graph illustrating a driving waveform in a third embodiment of the present disclosure.

FIG. 15 is a graph illustrating the drive waveform Va according to the third embodiment.

The drive waveform Va according to the third embodiment includes the first discharge pulse Pa1, the second discharge pulse Pa2, and the third discharge pulse Pa3 arranged in time series. The non-discharge pulse Pb is arranged between the second discharge pulse Pa2 and the third discharge pulse Pa3.

A relation among the non-discharge pulse Pb, the second discharge pulse Pa2, and the third discharge pulse Pa3 in the third embodiment are similar to a relation among non-discharge pulse Pb, the first discharge pulse Pa1, and the second discharge pulse Pa2 in the second embodiment.

The third discharge pulse Pa3 includes an expansion waveform element a4 to expand the pressure chamber 121, a holding waveform element b4 to hold an expansion state of the pressure chamber 121 expanded by the expansion waveform element a4, and a contraction waveform element c4 to contract the pressure chamber 121 from a state held by the holding waveform element b4 to discharge a liquid.

The expansion waveform element a4 of the third discharge pulse Pa3 is a waveform falling from the intermediate potential Vm (or reference potential) to the potential V4 ($V4<V2$). The holding waveform element b4 is a waveform holding the potential V4. The contraction waveform element c4 is a waveform rising from the potential V4 to the intermediate potential Vm. A peak value of the third discharge pulse Pa3 is Vp4.

The liquid droplets discharged by the first discharge pulse Pa1, the second discharge pulse Pa2, and the third discharge pulse Pa3 are merged into one droplet.

As a result, the printer 1 (liquid discharge apparatus) can discharge a large droplet while reducing a voltage of a discharge pulse and a variation width in a discharge speed Vj.

Thus, the drive waveform includes three or more discharge pulses each configured to cause the head 100 (liquid discharge head) to discharge the liquid.

Next, a fourth embodiment of the present disclosure is described with reference to FIG. 16.

Figure 16:
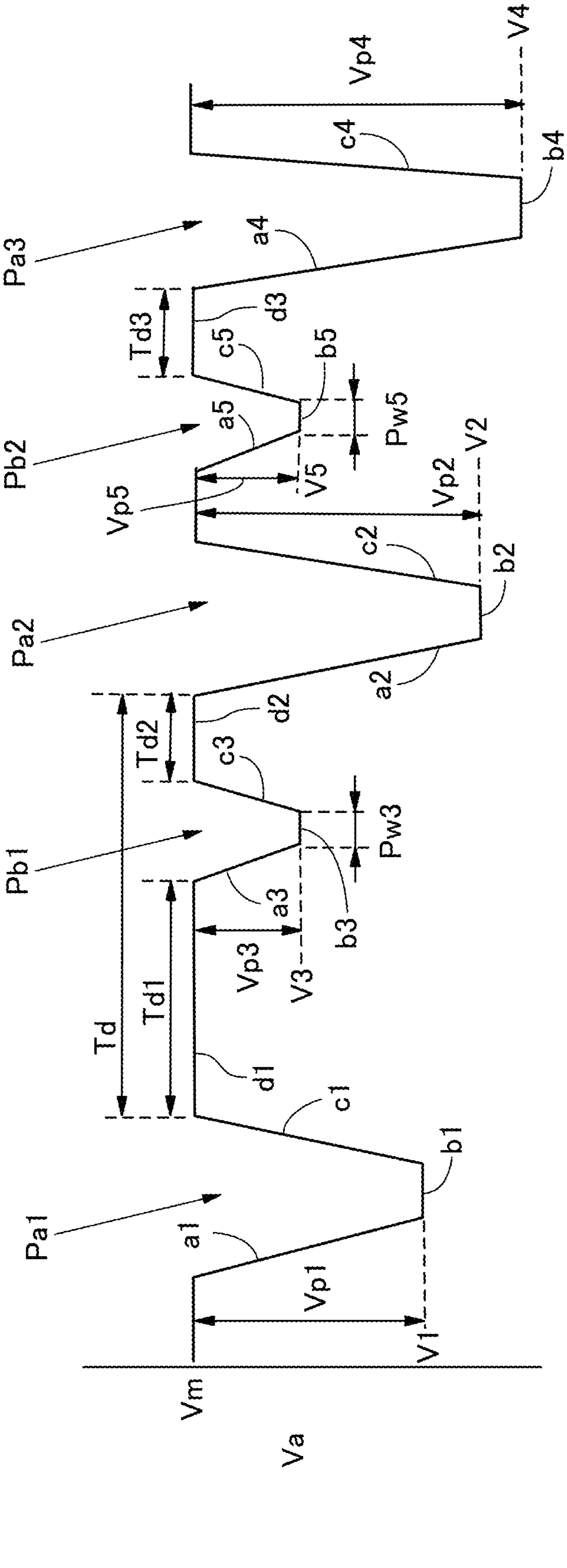
FIG. 16 is a graph illustrating a driving waveform in a fourth embodiment of the present disclosure.

FIG. 16 is a graph illustrating the drive waveform Va according to the fourth embodiment.

A drive waveform Va according to the fourth embodiment also includes the first discharge pulse Pa1, the second discharge pulse Pa2, and the third discharge pulse Pa3 arranged in time series. The non-discharge pulse Pb1 is disposed between the first discharge pulse Pa1 and the second discharge pulse Pb2. The non-discharge pulse Pb2 is disposed between the second discharge pulse Pa2 and the third discharge pulse Pb3.

The non-discharge pulse Pb1 is the same as the non-discharge pulse Pb of the second embodiment. A relation between the first discharge pulse Pa1 and the second discharge pulse Pa2 is the same as the relation between the first discharge pulse Pa1 and the second discharge pulse Pa2 that of the second embodiment.

The non-discharge pulse Pb includes an expansion waveform element a5 to expand the pressure chamber 121, a holding waveform element b5 to hold an expansion state of the pressure chamber 121 expanded by the expansion waveform element a5, and a contraction waveform element c5 to contract the pressure chamber 121 from a state held by the holding waveform element b5.

The expansion waveform element a5 of the non-discharge pulse Pb2 is a waveform falling from the intermediate potential Vm (or reference potential) to the potential V5. The potential V5 may be the same as the potential V3. The potential V5 may be different from the potential V3. The holding waveform element b5 is a waveform holding the potential V5. The contraction waveform element c5 is a waveform rising from the potential V5 to the intermediate potential Vm. The peak value of the non-discharge pulse Pb2 is set to a voltage Vp5 (Vp5<Vp3<Vp1<Vp2<Vp4).

A period of the holding waveform element b5 of the non-discharge pulse Pb2 is defined as a pulse width Pw5. The pulse width Pw5 is shorter than a resonant timing of the meniscus vibration generated by the non-discharge pulse Pb2. That is, the pulse width Pw5 is set shorter than a cycle of the meniscus vibration generated by the non-discharge pulse Pb2. Thus, the drive waveform generator 402 can shorten a waveform length of the non-discharge pulse Pb2 and a waveform length of the drive waveform Va.

A voltage changing time of the non-discharge pulse Pb2 is shorter than a voltage changing time of each of the first discharge pulse Pa1, the second discharge pulse Pa2, and the third discharge pulse Pa3. The voltage changing time of the non-discharge pulse Pb2 is a changing time of the expansion waveform element a5 and the contraction waveform element c5. The voltage changing time of the first discharge pulse Pa1 is a changing time of the expansion waveform element a1 and the contraction waveform element c1. The voltage changing time of the second discharge pulse Pa2 is a changing time of the expansion waveform element a2 and the contraction waveform element c2. The voltage changing time of the third discharge pulse Pa3 is a changing time of the expansion waveform element a3 and the contraction waveform element c3. Thus, the drive waveform generator 402 can shorten a waveform length of the non-discharge pulse Pb2 and a waveform length of the drive waveform Va.

A pulse interval Td3 is defined as a time period of an inter-pulse holding waveform element d3 from an end point of the contraction waveform element c5 of the non-discharge pulse Pb2 to a start point of the expansion waveform element a4 of the third discharge pulse Pa3. This pulse interval Td3 is a time period in which the liquid is discharged by the third discharge pulse Pa3 in the resonant state (resonant timing) in which the third discharge pulse Pa3 resonates with the meniscus vibration of the liquid in the nozzle 111 by the contraction waveform element c5 of the non-discharge pulse Pb2.

The liquid droplets discharged by the first discharge pulse Pa1, the second discharge pulse Pa2, and the third discharge pulse Pa3 are merged into one droplet.

Therefore, the drive waveform generator 402 according to the fourth embodiment inserts the non-discharge pulse Pb2 before the third discharge pulse Pa3 and after the second discharge pulse Pa2, so that the liquid discharge operation by the third discharge pulse Pa3 is performed by using the meniscus vibration by the non-discharge pulse Pb2.

As a result, the printer 1 (liquid discharge apparatus) can discharge a large droplet while reducing a voltage of a discharge pulse and a variation width in a discharge speed Vj.

In the present embodiments, a "liquid" discharged from the head is not particularly limited as long as the liquid has a viscosity and surface tension of degrees dischargeable from the head. Preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

Examples of an energy source to generate energy to discharge liquid include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

Examples of the "liquid discharge apparatus" include, not only apparatuses capable of discharging liquid to materials to which liquid can adhere, but also apparatuses to discharge a liquid toward gas or into a liquid.

The "liquid discharge apparatus" may include units to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material on which liquid can adhere" represents a material on which liquid is at least temporarily adhered, a material on which liquid is adhered and fixed, or a material into which liquid is adhered to permeate. Examples of the "material on which liquid can adhere" include recording media such as a paper sheet, recording paper, and a recording sheet of paper, film, and cloth, electronic components such as an electronic substrate and a piezoelectric element, and media such as a powder layer, an organ model, and a testing cell. The "material on which liquid can adhere" includes any material on which liquid adheres unless particularly limited.

Examples of the "material on which liquid can adhere" include any materials on which liquid can adhere even temporarily, such as paper, thread, fiber, fabric, leather, metal, plastic, glass, wood, and ceramic.

The "liquid discharge apparatus" may be an apparatus to relatively move the head and a material on which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet to coat the treatment liquid on a sheet surface to reform the sheet surface, and an injection granulation apparatus in which a composition liquid including raw materials dispersed in a solution is injected through nozzles to granulate fine particles of the raw materials.

The terms "image formation", "recording", "printing", "image printing", and "fabricating" used herein may be used synonymously with each other.

Each of the functions of the described embodiments such as the drive waveform generator 402, the head controller 401, or the discharge timing generator 404 may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A liquid discharge apparatus comprising:

a liquid discharge head configured to discharge a liquid; and a drive waveform generator configured to generate a drive waveform to be applied to the liquid discharge head, the drive waveform including:

a plurality of discharge pulses consisting of a first discharge pulse to cause the liquid discharge head to discharge the liquid and a second discharge pulse after the first discharge pulse to cause the liquid discharge head to discharge the liquid, the first discharge pulse and the second discharge pulse are in a nonresonant state;

a pulse interval between the first discharge pulse and the second discharge pulse, the pulse interval is set to a time period in which the liquid is discharged by the second discharge pulse in the nonresonant state in which the second discharge pulse is nonresonant with a meniscus vibration generated by the first discharge pulse; and a non-discharge pulse between the first discharge pulse and the second discharge pulse, wherein the non-discharge pulse generates another meniscus vibration that does not cause the liquid discharge head to discharge the liquid.

2. The liquid discharge apparatus according to claim 1, wherein the drive waveform further includes another pulse interval between the non-discharge pulse and the second discharge pulse, said another pulse interval being equal to a time period in which the liquid is discharged by the second discharge pulse in a resonant state in which the second discharge pulse is resonant with said another meniscus vibration generated by the non-discharge pulse.

3. The liquid discharge apparatus according to claim 1, wherein the drive waveform further includes another pulse interval between the first discharge pulse and the non-discharge pulse, said another pulse interval being equal to a time period in which said another meniscus vibration generated by the non-discharge pulse is damped by the meniscus vibration generated by the first discharge pulse.

4. The liquid discharge apparatus according to claim 1, wherein the liquid discharge head includes;

a nozzle from which the liquid is discharged; and a pressure chamber communicating with the nozzle, the pressure chamber accommodating the liquid to be discharged from the nozzle, and the non-discharge pulse includes:

an expansion waveform element to expand the pressure chamber;

a holding waveform element to hold an expansion state of the pressure chamber expanded by the expansion waveform element; and a contraction waveform element to contract the pressure chamber from a state held by the holding waveform element, and the holding waveform element has a pulse width equal to a time period shorter than a cycle of said another meniscus vibration generated by the non-discharge pulse.

5. The liquid discharge apparatus according to claim 1, wherein the liquid discharge head includes;

a nozzle from which the liquid is discharged; and a pressure chamber communicating with the nozzle, the pressure chamber accommodating the liquid to be discharged from the nozzle, and the non-discharge pulse includes:

an expansion waveform element to expand the pressure chamber;

a holding waveform element to hold an expansion state of the pressure chamber expanded by the expansion waveform element; and a contraction waveform element to contract the pressure chamber from a state held by the holding waveform element, and the first discharge pulse includes:

a first expansion waveform element to expand the pressure chamber;

a first holding waveform element to hold an expansion state of the pressure chamber expanded by the first expansion waveform element; and a first contraction waveform element to contract the pressure chamber from a state held by the first holding waveform element, and the second discharge pulse includes:

a second expansion waveform element to expand the pressure chamber;

a second holding waveform element to hold an expansion state of the pressure chamber expanded by the second expansion waveform element; and a second contraction waveform element to contract the pressure chamber from a state held by the second holding waveform element, and the non-discharge pulse has a voltage changing time being a sum of a changing time of the expansion waveform element and the contraction waveform element, the first discharge pulse has a voltage changing time being a sum of a changing time of the first expansion waveform element and the first contraction waveform element, and the second discharge pulse has a voltage changing time being a sum of a changing time of the second expansion waveform element and the second contraction waveform element, and the voltage changing time of the non-discharge pulse is shorter than the voltage changing time of each of the first discharge pulse and the second discharge pulse.

6. The liquid discharge apparatus according to claim 1, wherein the non-discharge pulse includes one or more non-discharge pulses.

7. The liquid discharge apparatus according to claim 1, wherein the liquid discharge head includes:

a nozzle from which the liquid is discharged; and a pressure chamber communicating with the nozzle, the pressure chamber accommodating the liquid to be discharged from the nozzle, and the first discharge pulse includes:

a first expansion waveform element to expand the pressure chamber;

a first holding waveform element to hold an expansion state of the pressure chamber expanded by the first expansion waveform element; and a first contraction waveform element to contract the pressure chamber from a state held by the first holding waveform element, and the first holding waveform element has a pulse interval equal to a time period in which the liquid is discharged by the first contraction waveform element in a resonant state in which the first contraction waveform element is resonant with a meniscus vibration generated by the first expansion waveform element.

8. The liquid discharge apparatus according to claim 1, wherein the liquid discharge head includes:

a nozzle from which the liquid is discharged; and a pressure chamber communicating with the nozzle, the pressure chamber accommodating the liquid to be discharged from the nozzle, and the second discharge pulse includes:

a second expansion waveform element to expand the pressure chamber;

a second holding waveform element to hold an expansion state of the pressure chamber expanded by the second expansion waveform element; and a second contraction waveform element to contract the pressure chamber from a state held by the second holding waveform element, and the second holding waveform element has a pulse interval equal to a time period in which the liquid is discharged by the second contraction waveform element in a resonant state in which the second contraction waveform element is resonant with a meniscus vibration generated by the second expansion waveform element.

9. The liquid discharge apparatus according to claim 1, wherein the pulse interval is set to a shortest time period in which the liquid is discharged by the second discharge pulse in the nonresonant state in which the second discharge pulse is nonresonant with the meniscus vibration generated by the first discharge pulse.

10. The liquid discharge apparatus according to claim 1, wherein the first discharge pulse and the second discharge pulse are the only discharge pulses of the plurality of discharge pulses.

11. The liquid discharge apparatus according to claim 10, wherein the second discharge pulse has a potential that is larger than a potential of the first discharge pulse, and the potential of the first discharge pulse is larger than a potential of the non-discharge pulse.

12. A drive waveform generator comprising:

circuitry configured to:

generate a drive waveform; and apply the drive waveform to a liquid discharge head to cause the liquid discharge head to discharge a liquid, the drive waveform including:

a plurality of discharge pulses consisting of a first discharge pulse to cause the liquid discharge head to discharge the liquid and a second discharge pulse after the first discharge pulse to cause the liquid discharge head to discharge the liquid, the first discharge pulse and the second discharge pulse are in a nonresonant state;

a pulse interval between the first discharge pulse and the second discharge pulse, the pulse interval is set to a time period in which the liquid is discharged by the second discharge pulse in the nonresonant state in which the second discharge pulse is nonresonant with a meniscus vibration generated by the first discharge pulse; and a non-discharge pulse between the first discharge pulse and the second discharge pulse, wherein the non-discharge pulse generates another meniscus vibration that does not cause the liquid discharge head to discharge the liquid.

13. The drive waveform generator according to claim 12, wherein the drive waveform further includes:

another pulse interval between the non-discharge pulse and the second discharge pulse, said another pulse interval being equal to a time period in which the liquid is discharged by the second discharge pulse in a resonant state in which the second discharge pulse is resonant with the meniscus vibration generated by the non-discharge pulse.

14. A head drive method comprising:

generating a drive waveform; and applying the drive waveform to a liquid discharge head to cause the liquid discharge head to discharge a liquid, the drive waveform including:

a plurality of discharge pulses consisting of a first discharge pulse to cause the liquid discharge head to discharge the liquid and a second discharge pulse after the first discharge pulse to cause the liquid discharge head to discharge the liquid, the first discharge pulse and the second discharge pulse are in a nonresonant state;

a pulse interval between the first discharge pulse and the second discharge pulse, the pulse interval is set to a time period in which the liquid is discharged by the second discharge pulse in the nonresonant state in which the second discharge pulse is nonresonant with a meniscus vibration generated by the first discharge pulse; and a non-discharge pulse between the first discharge pulse and the second discharge pulse, wherein the non-discharge pulse generates another meniscus vibration that does not cause the liquid discharge head to discharge the liquid.

* * * * *